United States Patent
Takahashi (10) Patent No.: US 9,918,300 B2
(45) Date of Patent: Mar. 13, 2018

(54) COMMUNICATION APPARATUS, CONTROL METHOD THEREOF, AND PROGRAM

(71) Applicant: CANON KABUSHIKI KAISHA, Tokyo (JP)

(72) Inventor: Seiji Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/769,400

(22) PCT Filed: Feb. 14, 2014

(86) PCT No.: PCT/JP2014/000767
§ 371 (c)(1),
(2) Date: Aug. 20, 2015

(87) PCT Pub. No.: WO2014/129155
PCT Pub. Date: Aug. 28, 2014

(65) Prior Publication Data
US 2016/0007333 A1    Jan. 7, 2016

(30) Foreign Application Priority Data
Feb. 22, 2013 (JP) ................. 2013-033505

(51) Int. Cl.
H04W 72/04 (2009.01)
H04W 76/02 (2009.01)
(Continued)

(52) U.S. Cl.
CPC ......... H04W 72/0406 (2013.01); H04L 67/06 (2013.01); H04W 48/16 (2013.01);
(Continued)

(58) Field of Classification Search
None
See application file for complete search history.

(56) References Cited

U.S. PATENT DOCUMENTS 5,889,943 A    3/1999    Ji
7,613,426 B2  11/2009    Kuehnel et al.
(Continued)

FOREIGN PATENT DOCUMENTS

CA    2822802 A1    6/2012
CN    101341686 A   1/2009
(Continued)

OTHER PUBLICATIONS

IEEE Std 802.11u™—2011, IEEE Standard for Information Technology—Telecommunications and Information Exchange Between Systems—Local and Metropolitan Area Networks—Specific requirements, Part 11, Amendment 9, Feb. 25, 2011, pp. i-xvi, 1-190, The Institute of Electrical and Electronics Engineers, Inc., New York, NY, 2011.

*Primary Examiner* — Diane Lo
(74) *Attorney, Agent, or Firm* — Canon U.S.A., Inc. IP Division (57) ABSTRACT

A method for controlling a communication apparatus, includes specifying, before joining a wireless network, an external device that will be a data transmitting source, receiving related information relating to data to be transmitted from the specified external device, determining whether to receive the data to be transmitted based on the received related information, joining a wireless network when it is determined to receive the data to be transmitted, and receiving the data to be transmitted from the specified external device after joining the wireless network.

13 Claims, 6 Drawing Sheets

(51) Int. Cl.
*H04L 29/08* (2006.01)
*H04W 48/16* (2009.01)

(52) U.S. Cl.
CPC ......... *H04W 72/048* (2013.01); *H04W 76/02* (2013.01); *H04W 76/023* (2013.01)

(56) References Cited

U.S. PATENT DOCUMENTS

| | | | |
|---|---|---|---|
| 7,627,899 | B1 | 12/2009 | Tripathi |
| 7,925,244 | B2 | 4/2011 | Minor |
| 7,995,484 | B2 | 8/2011 | Myoshi |
| 8,122,162 | B2 | 2/2012 | Kweon et al. |
| 8,635,284 | B1 | 1/2014 | Tripathi |
| 2005/0110654 | A1 | 5/2005 | Kitano |
| 2006/0044599 | A1 | 3/2006 | Lipowitz |
| 2007/0141984 | A1 | 6/2007 | Kuehnel |
| 2007/0177822 | A1 | 8/2007 | Uno |
| 2009/0002730 | A1* | 1/2009 | Yamada ................ G06F 3/1204 358/1.9 |
| 2009/0066998 | A1 | 3/2009 | Kato |
| 2009/0069998 | A1 | 3/2009 | Mehrer et al. |
| 2009/0180425 | A1 | 7/2009 | Watanabe |
| 2009/0201377 | A1 | 8/2009 | Okano |
| 2011/0131631 | A1 | 6/2011 | Ihori et al. |
| 2011/0132174 | A1 | 6/2011 | Shishido |
| 2012/0203850 | A1 | 8/2012 | Luo |
| 2013/0040576 | A1 | 2/2013 | Yoon |
| 2013/0094047 | A1* | 4/2013 | Bailey .................... H04L 63/18 358/1.14 |
| 2016/0088507 | A1 | 3/2016 | Gao |

FOREIGN PATENT DOCUMENTS

| | | |
|---|---|---|
| CN | 102082588 A | 6/2011 |
| CN | 102860092 A | 1/2013 |
| EP | 2555490 A2 | 2/2013 |
| JP | 2002-223466 A | 8/2002 |
| JP | 2005159696 A | 6/2005 |
| JP | 2009521191 A | 5/2009 |
| JP | 2009-152689 A | 7/2009 |
| JP | 2009-170971 A | 7/2009 |
| JP | 2010-157977 A | 7/2010 |
| JP | 2011-114708 A | 6/2011 |
| JP | 2013-005120 A | 1/2013 |
| RU | 2432708 C2 | 10/2011 |
| RU | 2011130379 A | 1/2013 |
| RU | 2476029 C2 | 2/2013 |
| WO | 2006/080468 A1 | 8/2006 |
| WO | 2011/132174 A1 | 10/2011 |
| WO | 2012/111255 A1 | 8/2012 |
| WO | 2012/115385 A2 | 8/2012 |
| WO | 2012/173423 A2 | 12/2012 |

* cited by examiner

RECEPTION HISTORY INFORMATION

| FILE NAME | SIZE |
|---|---|
| IMG_0001.JPG | 3.2 MB |
| IMG_0002.JPG | 2.8 MB |
| IMG_0005.JPG | 2.1 MB |

COMMUNICATION APPARATUS, CONTROL METHOD THEREOF, AND PROGRAM

TECHNICAL FIELD

The present invention relates to a communication apparatus capable of communicating with an external device.

BACKGROUND ART

With the spread of wireless communication, an image file can now be transmitted by mounting a wireless communication function even on a portable terminal, such as a digital camera (PTL 1). For example, when performing data communication using a wireless local area network (LAN), such a method as first joining a wireless LAN network and then establishing communication with an external device on the network may be employed. In this case, the confirmation of whether the transmission and reception of the file to/from an external device is being properly performed is typically performed after communication has been established with the external device.

CITATION LIST

Patent Literature

PTL 1: Japanese Patent Application Laid-Open No. 2009-152689

SUMMARY OF INVENTION

Technical Problem

However, after a connection based on a wireless layer and communication with an external device have been established, if it is determined that the transmission and reception of data with the external device cannot be performed properly, the connection processing performed up to that point is wasted.

Solution to Problem

According to an aspect of the present invention, a communication apparatus includes a specifying unit configured to, before joining a wireless network, specify an external device that will be a data transmitting source, a first receiving unit configured to receive related information relating to data to be transmitted from the external device specified by the specifying unit, a determination unit configured to determine whether to receive the data to be transmitted based on the related information received by the receiving unit, a network joining unit configured to join a wireless network when the determination unit determines to receive the data to be transmitted, and a second receiving unit configured to receive the data to be transmitted from the external device specified by the specifying unit after the communication apparatus has joined the wireless network via the joining unit.

Advantageous Effects of Invention

According to the present invention, the probability of wasteful connection processing being executed can be reduced.

DESCRIPTION OF EMBODIMENTS

A communication apparatus according to a first exemplary embodiment will now be described with reference to the drawings. Although the following description will be made using a wireless LAN system based on the Institute of Electrical and Electronics Engineers (IEEE) 802.11 series as an example, the communication format is not limited to a wireless LAN system based on IEEE 802.11.

An example of the hardware configuration according to the present exemplary embodiment will now be described.

Figure 1:
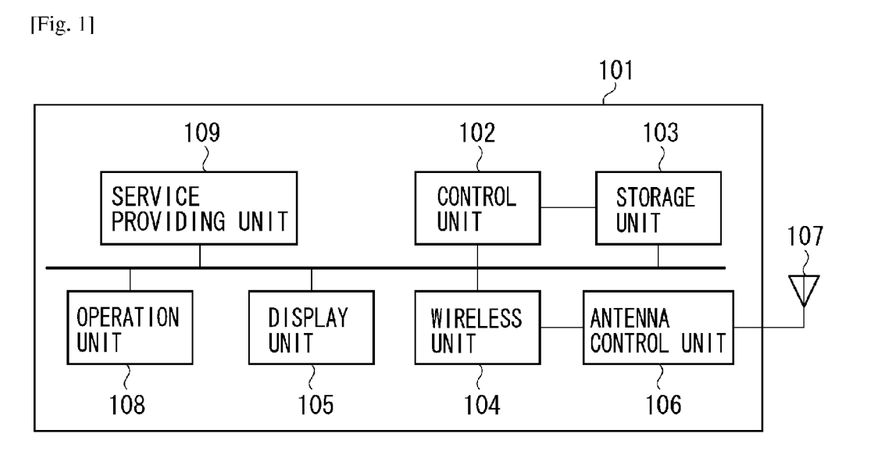
FIG. 1 is a block diagram of a communication apparatus according to the present invention.

FIG. 1 is a block diagram illustrating an example of the configuration of the respective apparatuses that are described below according to an exemplary embodiment to which the present invention can be applied. An overall apparatus 101 includes a control unit 102, which controls the overall apparatus by executing a control program stored in a storage unit 103. The control unit 102 includes one or a plurality of processors, such as a central processing unit (CPU) or a micro-processing unit (MPU). The control unit 102 also controls the setting of a communication parameter between this apparatus and another apparatus. The storage unit 103 stores the control program executed by the control unit 102 and various kinds of information, such as a communication parameter. Further, image data and files generated by the communication apparatus or received from an external device may also be stored in the storage unit 103. The storage unit 103 may be configured from various types of memories, such as a read-only memory (ROM), a random-access memory (RAM), a hard disk drive (HDD), and a flash memory. Each of the operations that are described below is performed by the control unit 102 executing a control program stored in the storage unit 103.

A wireless unit 104 performs wireless LAN communication based on the IEEE 802.11 series. A display unit 105 for presenting various displays has a function of outputting visually perceivable information like a liquid crystal display (LCD) or a light-emitting diode (LED), or a function capable of outputting sound like a speaker. The display unit 105 includes at least either the function of outputting visual information or sound information.

An antenna control unit 106 controls an antenna 107, so that signals are transmitted and received by wireless communication. An operation unit 108 lets the user perform various inputs for operating the communication apparatus. The operation unit 108 is configured from various buttons, a touch panel, and the like.

A service providing unit 109 includes a function of providing service information about an application level provided by the communication apparatus. For example, if this communication apparatus is a printer, the service providing unit 109 provides a printing function, and if the communication apparatus is a digital camera, the service providing unit 109 provides an imaging function.

Note that FIG. 1 is merely an example. The communication apparatus 101 may include hardware units other than the hardware units illustrated in FIG. 1.

Figure 2:
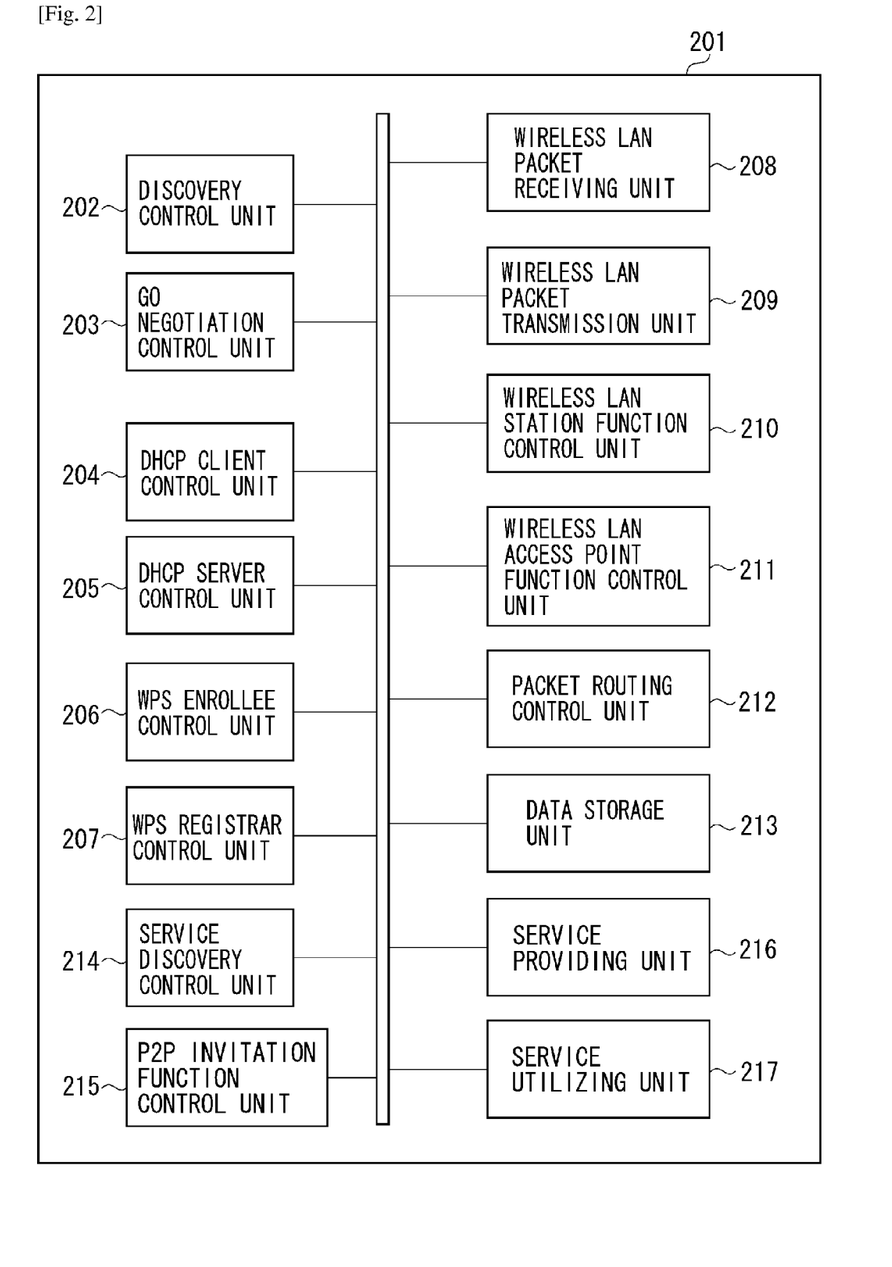
FIG. 2 is a software function block diagram of a communication apparatus according to the present invention.

FIG. 2 is a block diagram illustrating an example of a configuration of the software function blocks executing the communication control functions described below. A overall software function block 201 includes a Discovery control unit 202 that operates search processing for searching for a communication apparatus that will be a communication counterparty.

A GO Negotiation control unit 203 performs control based on a Wi-Fi Direct protocol specification to determine the roles to be performed in the wireless layer, such as which communication apparatus will serve as an access point and which communication apparatus will serve as a wireless LAN station. In Wi-Fi Direct, the communication apparatus performing the wireless LAN access point function is referred to as a P2P group owner (hereinafter, "GO"), and the communication apparatus performing the wireless LAN station function is referred to as a P2P client (hereinafter, "CL"). If the communication apparatus is to act as the GO or the wireless LAN access point, a below-described wireless LAN access point function control unit 211 is started. If the communication apparatus is to act as the CL or the wireless LAN station, a below-described wireless LAN station function control unit 210 is started. The protocol of this GO Negotiation is determined based on the Wi-Fi Direct protocol specification. Since this is not a major point of the present invention, a description thereof will be omitted here. In Wi-Fi Direct, a network built by GO is referred to as a P2P group. In the present specification too, a network is also sometimes described as a P2P group. In the present exemplary embodiment, these terms are used with the same meaning.

Further, in the present specification, the P2P group owner (GO), P2P client (CL), and a group of communication apparatuses whose roles have not yet been determined are collectively referred to as P2P devices.

A dynamic host configuration protocol (DHCP) client control unit 204 is started when the role of the communication apparatus is determined by the GO Negotiation control unit 203 to be as a wireless LAN station. A DHCP server control unit 205 is started when the role of the communication apparatus is determined by the GO Negotiation control unit 203 to be as a wireless LAN access point.

A Wi-Fi protected setup (WPS) enrollee control unit 206 receives a communication parameter required for wireless LAN communication from another WPS registrar apparatus. Similar to the DHCP client control unit 204, the WPS enrollee control unit 206 is started when the role of that communication apparatus is determined to be as a wireless LAN station. A WPS registrar control unit 207 provides a communication parameter required for wireless LAN communication to another WPS enrollee apparatus. Similar to the DHCP server control unit 205, the WPS registrar control unit 207 is started when the role of that communication apparatus is determined to be as a wireless LAN access point. Examples of the communication parameter provided by the WPS registrar include a service set identifier (SSID) as a network identifier, an encryption key, an encryption method, an authentication key, an authentication method and the like.

A wireless LAN packet receiving unit 208 and a wireless LAN packet transmission unit 209 control the transmission and reception of all packets, including those for higher layer transmission protocol. The wireless LAN station function control unit 210 performs authentication and encryption processing when the apparatus operates as a wireless LAN station, and joins a wireless network built by an apparatus operating as a wireless LAN access point. The wireless LAN access point function control unit 211 builds a wireless network when that apparatus operates as a wireless LAN access point, and performs authentication and encryption processing and manages communication apparatus counterparties, for example. The wireless LAN station function control unit 210 and the wireless LAN access point function control unit 211 can operate just either one of these functions or operate both of these functions simultaneously.

A packet routing control unit 212 performs bridging and routing of communication packets when the wireless LAN access point function control unit 211 is operating. A data storage unit 213 stores the software itself, wireless LAN parameters, and various tables such as a DHCP address table and Address Resolution Protocol (ARP) table.

A service discovery control unit 214 controls a service discovery function that is unique to Wi-Fi Direct. The service discovery function exchanges service information held by a communication counterparty apparatus by transmitting and receiving an action frame defined in IEEE 802.11u. Specifically, the service discovery control unit 214 transmits an SD query, and receives an SD response as a response. Alternatively, the service discovery control unit 214 receives an SD query from a counterparty apparatus, and transmits an SD response as a response.

A P2P invitation function control unit 215 controls an invitation function defined in the Wi-Fi Direct standard. Since this invitation function is defined in the Wi-Fi Direct standard, a description thereof will be omitted here, although it is a function that prompts a P2P device whose role as a GO device or as a CL device has not yet been determined to be connected as a P2P client.

A service providing unit 216 provides an application layer service. The term application layer refers to a service providing layer that is fifth layer or higher in the open systems interconnection (OSI) reference model. In other words, the service providing unit 216 provides, for example, a printing service or a file transmitting service.

A service utilization unit 217 in the application layer utilizes the service provided by the service providing unit 216 of the application layer of the counterparty apparatus. In other words, the service utilization unit 217 controls a function of transmitting a printed product to the printing service providing apparatus.

Not all of the function blocks illustrated in FIG. 2 have to be provided by software, at least a portion of the function blocks may be provided by software. Further, each of the function blocks illustrated in FIG. 2 is interrelated with the other blocks. Moreover, the respective function blocks illustrated in FIG. 2 are just an example. A plurality of function blocks may configure one function block, or any one of the function blocks may be divided into a plurality blocks to perform a plurality of functions.

Further, in the present exemplary embodiment, the service in the application layer is realized by an apparatus that provides that service and an apparatus that utilizes that service. If, for example, the service in the application layer is a printing service, the service providing apparatus 216 is a printer, and printing is performed by receiving print data transmitted from a personal computer (PC) and the like. In this example, the service utilizing apparatus is an apparatus such as a PC, which generates print data and transmits the generated print data to the printer as the service providing apparatus. Moreover, if, for example, the service is an image streaming service, the service providing apparatus 216 is a display apparatus, which receives and displays image data transmitted from a PC and the like. In this example, the service utilizing apparatus is an apparatus such as a PC, which generates image data and transmits the generated image data to the display apparatus as the service providing apparatus.

Figure 3:
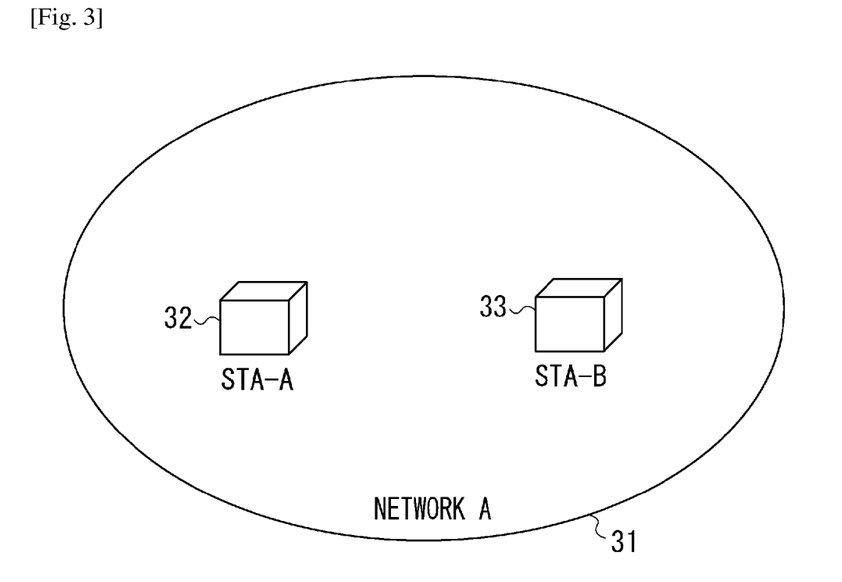
FIG. 3 illustrates an example of a network configuration by a communication apparatus according to the present invention.

FIG. 3 illustrates a network A31 (hereinafter, "network A") configured from a communication apparatus A32 (hereinafter, "STA-A") and a communication apparatus B33 (hereinafter, "STA-B"). All of these apparatuses have the configuration illustrated in the above-described FIGS. 1 and 2.

Figure 4:
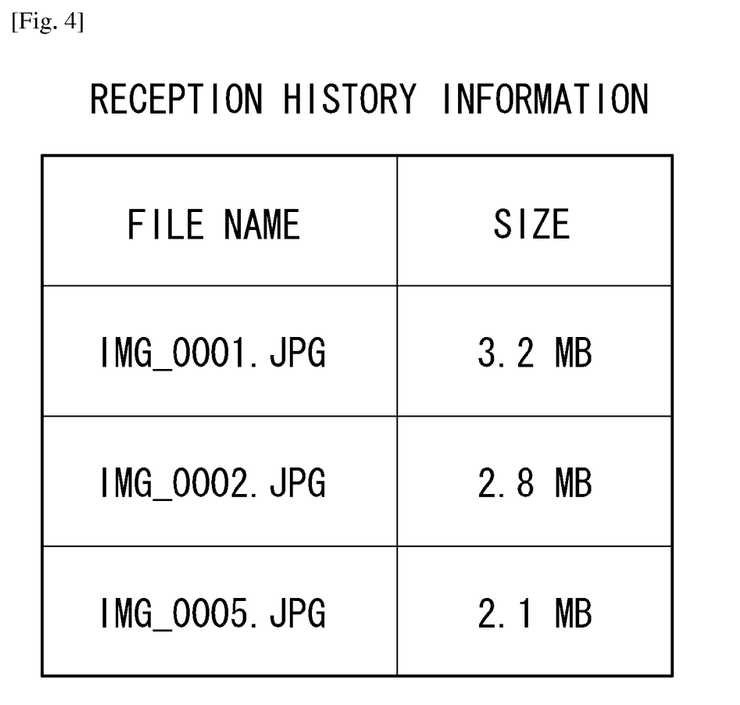
FIG. 4 illustrates an example of management information in a communication apparatus according to the present invention.

FIG. 4 illustrates an example of file reception history information in the communication apparatus. The reception history information is managed by the storage unit 103. In the reception history information, information (file name and size) about files received in the past is recorded. The method for recording the reception history information will be described below with reference to FIG. 6.

Figure 5:
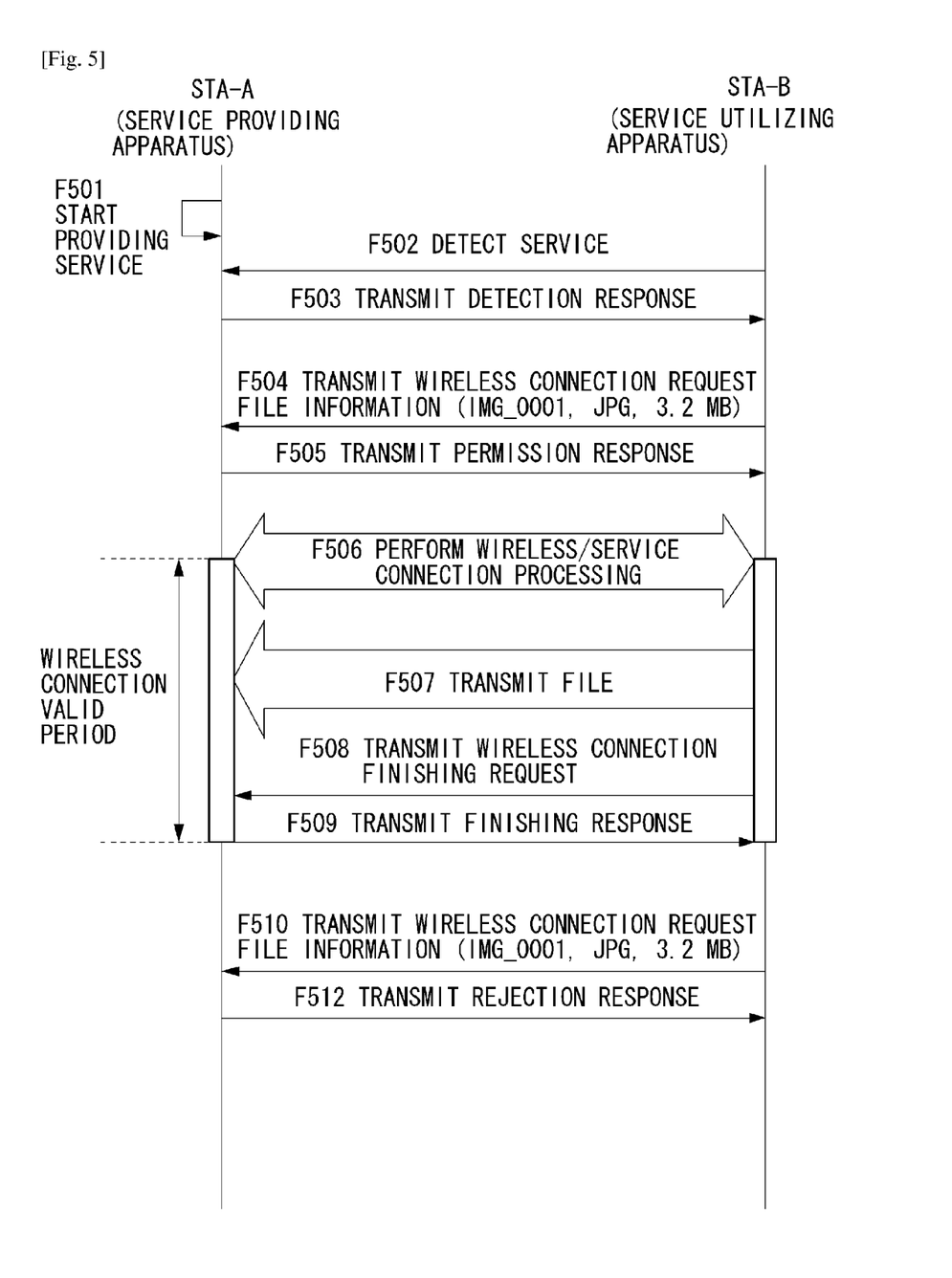
FIG. 5 is a sequence diagram between communication apparatuses according to the present invention.

FIG. 5 is a schematic diagram illustrating an operation sequence between communication apparatuses. In the example illustrated in FIG. 5, the STA-A acts as the file transmitting service providing apparatus, and the STA-B acts as the file transmitting service utilizing apparatus.

In step F501, the STA-A starts an operation for providing a file transmitting service.

In step F502, to utilize the file transmitting service, the STA-B transmits an inquiry signal to detect the communication apparatus that is providing the file transmitting service. Then, in step F503, since the STA-A, which has received the inquiry signal, is providing the file transmitting service, the STA-A transmits a detection response signal to the STA-B. If the STA-A does not support or is not providing the service indicated by the detection signal (i.e., the file transmitting service), the STA-A either does not respond to the detection signal, or issues an error response. Based on this processing, the STA-A and the STA-B can specify each of the devices supporting the file transmitting service as a device capable of transmitting and receiving data. If there is a plurality of devices supporting a file transmitting service in the vicinity, a list of the detected services may be displayed on the display unit 105 of the STA-A, and the service that is transmitting and receiving data (i.e., the device that will be the communication counterparty) may be specified based on a user operation.

In step F504, the STA-B, which has received the detection response signal, transmits to the STA-A a signal requesting a wireless LAN connection. In this step, the STA-B also notifies the file information (file name and size), which is related information about the file to be transmitted, by utilizing a Public Action frame described in IEEE 802.11. In step F505, the STA-A, which has received the connection request signal, determines whether the file indicated by the file information has already been received, and if that file has not already been received, transmits to the STA-B a signal permitting the wireless LAN connection. This determination method will be described below with reference to FIG. 6. Further, in the present exemplary embodiment, at the stage of step F505, the STA-A and the STA-B are not connected by the wireless layer. In other words, the STA-A and the STA-B have not yet started connection processing based on Wi-Fi Direct, and have not joined a wireless LAN network.

In step F506, the STA-B, which has received the permission response signal, performs connection processing with the STA-A based on the wireless layer, and the predetermined connection processing prescribed in the file transmitting service. Connection processing based on the wireless layer is connection processing that is based on the above-described Wi-Fi Direct specification. More specifically, either one of the STA-A and the STA-B becomes the P2P group owner, and the other becomes the P2P client. A connection is made by the CL joining a wireless network built by the GO. By performing such network joining processing, the STA-A and the STA-B belong to the same wireless network.

Although an example is described here in which the apparatus according to the present exemplary embodiment performs connection processing based on the wireless layer after service detection, the connection processing based on the wireless layer may be performed in advance, and in step F506 only the service connection processing may be performed.

After the connection processing has been completed, in step F507, the STA-B transmits the file to the STA-A by utilizing the file transmitting service.

After file transmission has been completed, in step F508, the STA-B transmits a wireless LAN connection finishing request to the STA-A. In step F509, the STA-A, which has received the finishing request, transmits a finishing response to the STA-B.

If, for example, after the wireless LAN connection has finished, in step F510, the STA-B again transmits to the STA-A a signal requesting a wireless LAN connection, and in this case, in step F512, the file information included in the connection request signal is the same as the file information transmitted. Since the STA-A that received the connection request signal has already received the file indicated by the file information, in step F504, the STA-A transmits a signal rejecting a wireless LAN connection. This rejection response may include an error message that the file to be transmitted has already been received.

Figure 6:
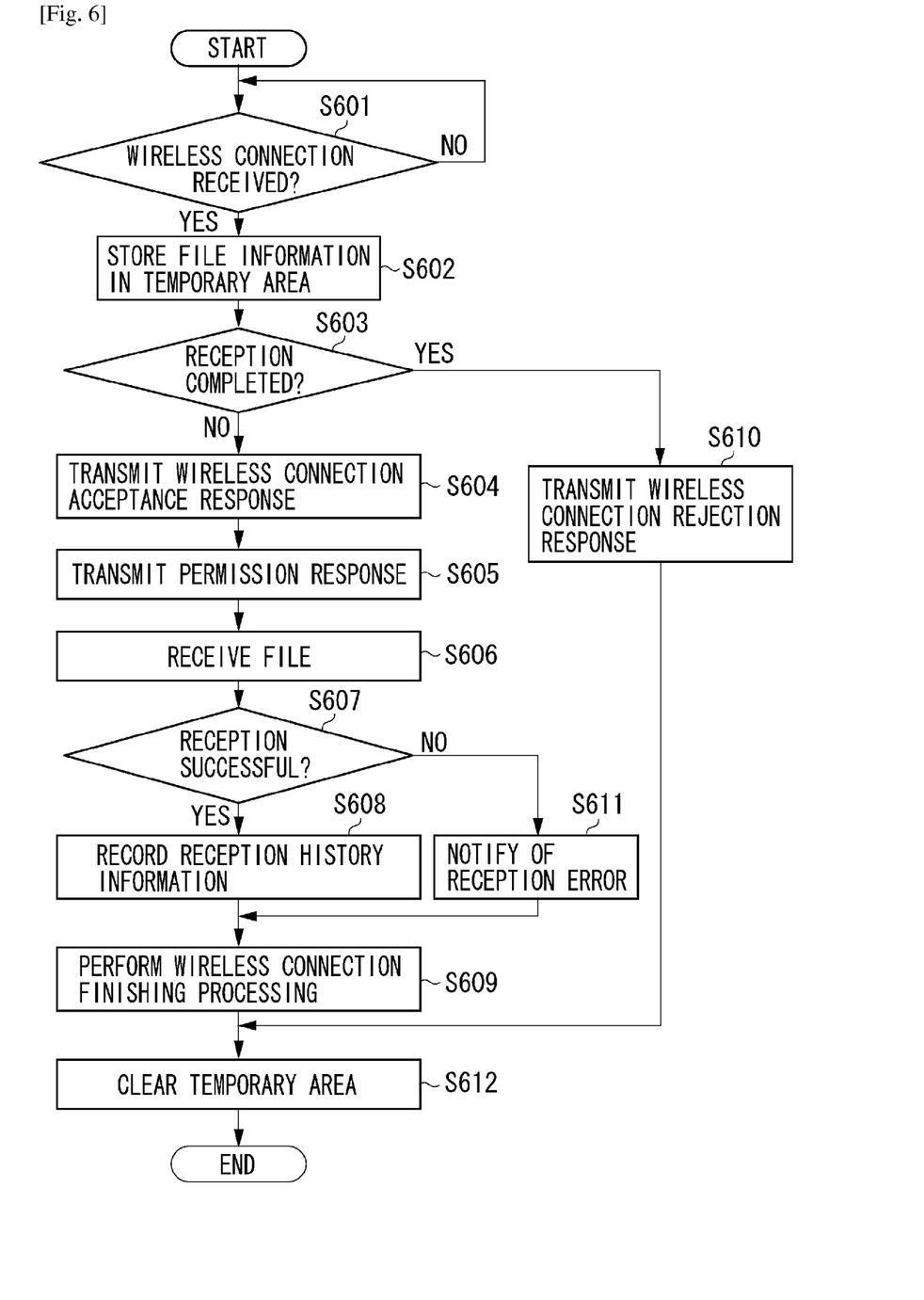
FIG. 6 is a flowchart illustrating operation of a communication apparatus according to the present invention.

FIG. 6 is a flowchart illustrating a case in which the communication apparatus according to the present exemplary embodiment operates as a file transmitting service providing apparatus. This flowchart illustrates operations that are performed after the STA-A has transmitted the response in step F503 illustrated in FIG. 5. Each step in this flowchart is performed by the control unit 102 executing a program stored in the storage unit 103.

In step S601, the STA-A waits to receive a wireless connection request signal from the STA-B. If a signal is not received (NO in step S601), the STA-A continues to wait until a predetermined time has elapsed. If a signal is received (YES in step S601), the processing proceeds to step S602.

In step S602, the STA-A temporarily stores the file information received in step S601 in the storage unit 103.

In step S603, the STA-A determines whether the file indicated by the file information received in step S601 has already been received. Specifically, the STA-A refers to the reception history information illustrated in FIG. 4, and determines whether a combination is present that matches both the file name and size in the file information. If a combination is not present, it is determined that the subject file has not been received (NO in step S603), and the processing proceeds to step S604. On the other hand, if a combination is present, it is determined that the subject file has already been received (YES in step S603), and the processing proceeds to step S610.

In step S604, the STA-A transmits to the STA-B a signal for permitting the wireless LAN connection. Step S604 corresponds to the processing by the STA-A performed in step F505 in FIG. 5.

In step S605, the STA-A performs connection processing with the STA-B based on a wireless layer, and the predetermined connection processing prescribed in the file transmitting service. Step S605 corresponds to the processing by the STA-A performed in step F506 in FIG. 5.

In step S606, the STA-A receives the file from the STA-B by utilizing the file transmitting service. Step S606 corresponds to the processing by the STA-A performed in step F507 in FIG. 5.

In step S607, the STA-A determines whether the receiving processing performed in step S606 was successful. For example, if the time taken for the file receiving processing exceeds a predetermined duration, the STA-A determines that the receiving processing was not successful. If it is determined that the receiving processing was successful (YES in step S607), the processing proceeds to step S608, and if it is determined that the receiving processing was not successful (NO in step S607), the processing proceeds to step S611.

In step S608, the STA-A adds and records the file information stored in step S602 in the reception history information illustrated in FIG. 4.

In step S609, the STA-A finishes the wireless connection with the STA-B. Step S609 corresponds to the processing by the STA-A performed in steps F508 and F509 in FIG. 5.

In step S610, the STA-A transmits to the STA-B a signal for rejecting the wireless LAN connection. Step S610 corresponds to the processing by the STA-A performed in step F512 in FIG. 5. In this case, the STA-A can reject the connection with the STA-B before establishing a connection based on a wireless layer.

In step S611, the STA-A transmits to the STA-B the fact that file reception was not successful.

In step S612, the STA-A deletes the file information stored in step S602 from the storage unit 103.

Figure 7:
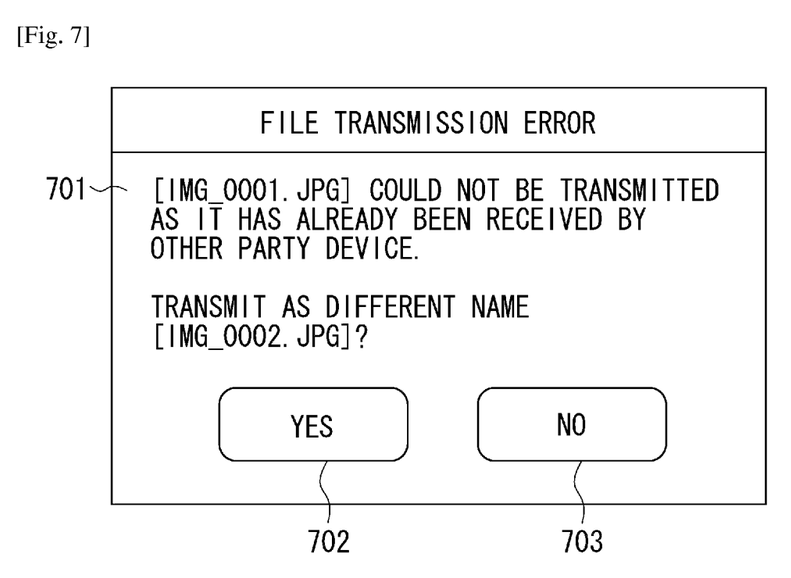
FIG. 7 illustrates an example of a GUI screen of a communication apparatus according to the present invention.

FIG. 7 is an example of a communication apparatus graphical user interface (GUI) according to the present exemplary embodiment. The screen illustrated in FIG. 7 is displayed on the 105 under the control of the control unit 102, and the user can request predetermined processing by operating the operation unit 108.

A file transmitting error screen 701 is displayed when the connection rejection response described in step F512 is received while the communication apparatus is operating as the service utilizing apparatus (STA-B) illustrated in FIG. 5. This rejection response includes an error message indicating that the file to be transmitted has already been received. When an icon 702 is selected, the STA-B changes the file name included in the wireless connection request, and transmits a request signal to the STA-A. When an icon 703 is selected, the file transmitting service utilization processing is finished.

Thus, according to the present exemplary embodiment, a communication apparatus operating as a service providing apparatus can prevent unnecessary wireless connections by issuing a response rejecting a connection when a wireless connection is requested for the file transmission of an already received file.

The above-described first exemplary embodiment, which illustrates an example for carrying out the present invention, may be subjected to various modifications, as long as such modifications do not depart from the gist of the present invention.

The communication apparatus according to the above-described first exemplary embodiment is not limited to a digital camera, a printer, and the like. The communication apparatus may be a PC, a tablet terminal, or a mobile terminal such as a mobile telephone or a smartphone. Further, the communication apparatus may be an image processing apparatus, such as a copying machine, a scanner, a facsimile machine, a multifunction peripheral, or a digital household appliance, such as a television or a recorder.

Although the above-described first exemplary embodiments is described using a wireless LAN based on IEEE 802.11 as an example, the present invention may also be performed based on other types of wireless communication, such as wireless universal serial bus (USB), MultiBand OFDM Alliance (MBOA), Bluetooth (registered trademark), ultra-wide band (UWB), and ZigBee (registered trademark). Further, the present invention may also be performed in a wired communication medium, such as wired LAN. Further, UWB includes wireless USB, wireless 1394, WINET, and the like.

Further, the information used to determine whether a file has already been received is not limited to the above-described file information (file name and size). For example, when the wireless connection request is received, the transmitting source may be determined by acquiring the media access control (MAC) address of the transmitting source apparatus from the received frame, and performing the following processing. Specifically, if the transmitting source is different, a wireless LAN connection may be established even if the file name is the same, and the file is received. If the transmitting source is the same, a wireless LAN connection is not established.

In addition, time and date information about the received file may be stored as the reception history information, and files received before a predetermined time may be excluded from the files that are subjected to processing to determine whether they have already been received.

The reception history information may also be synchronized with a file system in the communication apparatus. For example, the reception history information may be configured so that if a file in the communication apparatus is deleted, then the information about that corresponding file is also deleted from the reception history.

Further, if a change request for the file information is received from the transmitting apparatus before the file is received, the file information recorded in the reception history may be changed based on the request content. With this configuration, a determination can be made regarding whether a file has already been received based on the changed file information.

In addition, the applications of the file information are also not limited to determining whether a file has already been received. For example, in FIG. 5, the STA-A may compare the file size included in the file information with the available capacity in its own storage unit, and if it is determined that there is not enough available capacity to receive the file, transmit a rejection response to the STA-B.

Still further, the STA-A may also determine whether the file to be transmitted is in a file format that can be handled by the STA-A based on the file name extension included in the file information. If the file to be transmitted is in a file format that can be handled by the STA-A, the STA-A transmits a permission response, and if the file to be transmitted is not in a file format that can be handled by the STA-A, the STA-A transmits a rejection response.

Aspects of the present invention can also be realized by a computer of a system or apparatus (or devices such as a CPU or MPU) that reads out and executes software (a program code) recorded on a memory device (computer-readable medium) to perform the functions of the above-described embodiments. In such a case, this program, and the storage medium in which the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033505 filed Feb. 22, 2013, which is hereby incorporated by reference herein in its entirety.

The invention claimed is:

1. A communication apparatus comprising:
at least one processor;
a wireless communication interface;
wherein the at least one processor is configured to function as the following units:
a specifying unit configured to, before joining a wireless network, specify an external device that will be a content data transmitting source;
a first receiving unit configured to, before joining a wireless network, receive related information relating to content data to be transmitted from the external device specified by the specifying unit via the wireless communication interface;
a determination unit configured to, before joining a wireless network, determine whether to receive the content data to be transmitted based on the related information received by the first receiving unit;
a network joining unit configured to make the communication apparatus join a wireless network via the wireless communication interface when the determination unit determines to receive the content data to be transmitted; and
a second receiving unit configured to receive the content data to be transmitted from the external device specified by the specifying unit via the wireless communication interface after the communication apparatus has joined the wireless network via the network joining unit,
wherein the wireless communication interface is a single common interface used for reception of the related information by the first receiving unit and reception of the content data by the second receiving unit.

2. The communication apparatus according to claim 1, wherein the related information includes a name of the content data to be transmitted, and
wherein the determination unit is configured to determine not to receive the content data to be transmitted if the communication apparatus has content data with the same name as the name of the content data to be transmitted.

3. The communication apparatus according to claim 2, further comprising a transmitting unit configured to transmit a rejection signal to the external device via the wireless communication interface if the determination unit determines not to receive the content data to be transmitted.

4. The communication apparatus according to claim 2, further comprising a transmitting unit configured to transmit a permission signal to the external device via the wireless communication interface before joining a wireless network via the joining unit if the determination unit determines to receive the content data to be transmitted.

5. The communication apparatus according to claim 1, wherein the joining of the wireless network by the joining unit is performed not via a device other than the external device.

6. The communication apparatus according to claim 1, wherein the joining in the wireless network by the network joining unit is performed according to Wi-Fi direct standard.

7. The communication apparatus according to claim 1, wherein the communication apparatus is a printer.

8. The communication apparatus according to claim 1, wherein the communication apparatus is a mobile terminal.

9. The communication apparatus according to claim 1 wherein the communication apparatus is a mobile telephone.

10. The communication apparatus according to claim 1 wherein the wireless communication interface is a wireless LAN interface.

11. The communication apparatus according to claim 1, wherein the related information includes a name and size of the content data to be transmitted, and
wherein the determination unit is configured to determine not to receive the content data to be transmitted if the communication apparatus has content data with the same name and size as the name and size of the content data to be transmitted.

12. A method for controlling a communication apparatus having a wireless communication interface, the method comprising:
specifying, before joining a wireless network, an external device that will be a content data transmitting source;
receiving, before joining a wireless network, related information relating to content data to be transmitted from the specified external device via the wireless communication interface;
determining, before joining a wireless network, whether to receive the content data to be transmitted based on the received related information;
making the communication apparatus join a wireless network via the wireless communication interface when it is determined to receive the content data to be transmitted; and
receiving the content data to be transmitted from the specified external device via the wireless communication interface after joining the wireless network,
wherein the wireless communication interface is a single common interface used for reception of the related information by the first receiving unit and reception of the content data by the second receiving unit.

13. A non-transitory computer-readable storage medium storing a program that, when executed, causes a computer to execute a process for controlling a communication apparatus having a wireless communication interface, the process comprising:
specifying, before joining a wireless network, an external device that will be a content data transmitting source;
receiving, before joining a wireless network, related information relating to content data to be transmitted from the specified external device via the wireless communication interface;
determining, before joining a wireless network, whether to receive the content data to be transmitted based on the received related information;
making the communication apparatus join a wireless network via the wireless communication interface when it is determined to receive the content data to be transmitted; and receiving the content data to be transmitted from the specified external device via the wireless communication interface after joining the wireless network,
wherein the wireless communication interface is a single common interface used for reception of the related information by the first receiving unit and reception of the content data by the second receiving unit.

* * * * *